UNITED STATES PATENT OFFICE.

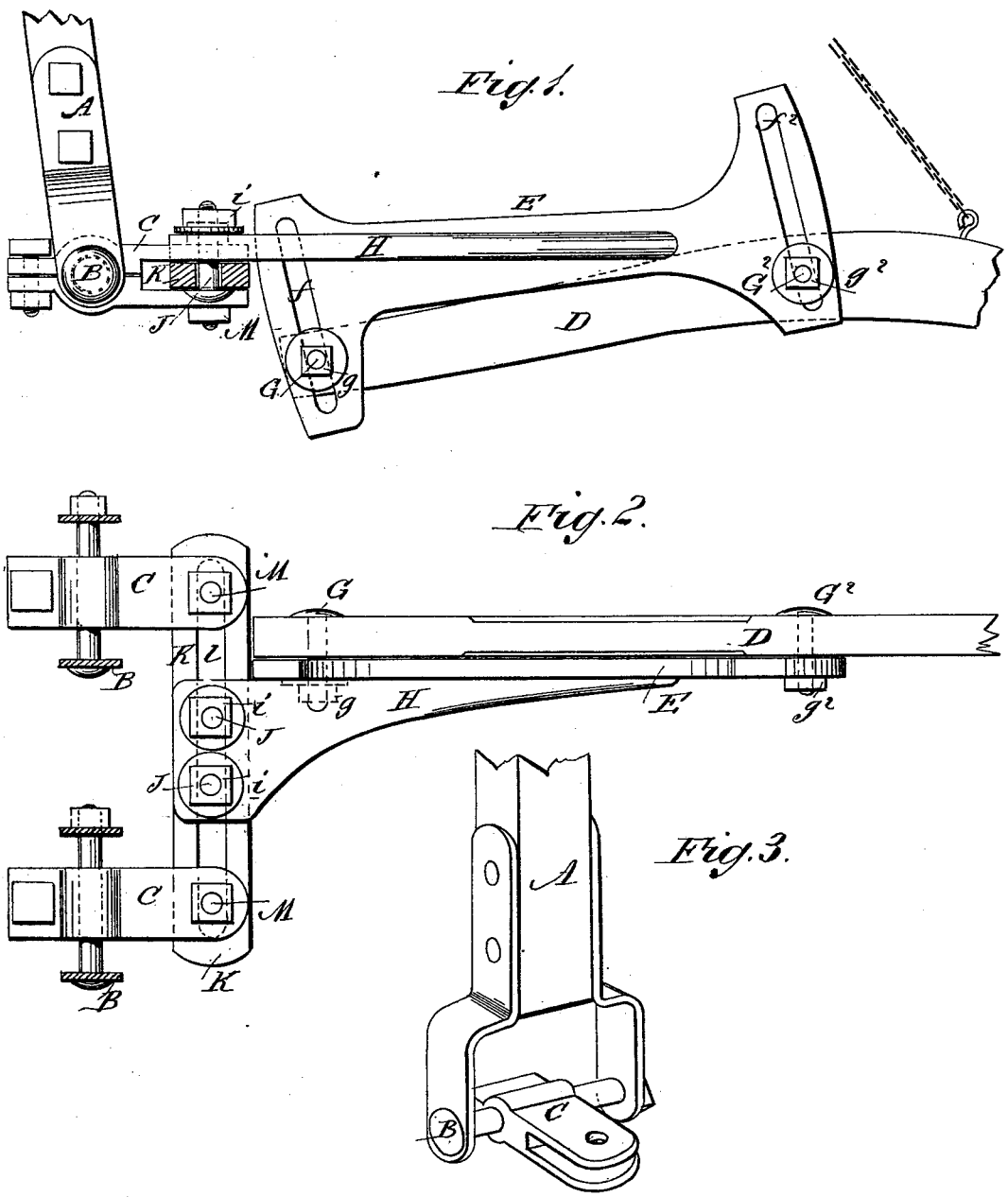

HOMER J. POTTER, OF CENTRALIA, KANSAS.

PLOW ATTACHMENT FOR CULTIVATORS.

SPECIFICATION forming part of Letters Patent No. 234,060, dated November 2, 1880.

Application filed August 10, 1880. (No model.)

To all whom it may concern:

Be it known that I, HOMER J. POTTER, of Centralia, in the county of Nemaha and State of Kansas, have invented a new and useful Improvement in Plow Attachments for Cultivators, of which the following is a specification.

My invention consists in a novel construction, arrangement, and combination of devices connected with a plow-beam, whereby provision is made for attaching said plow-beam to a cultivator after the cultivator-beams have been detached therefrom.

In the accompanying drawings, Figure 1 is a side view of my invention. Fig. 2 is a top view of the same. Fig. 3 is a detail view.

Similar letters of reference indicate corresponding parts.

A represents a hanger such as is used in connection with a double-beamed sulky-cultivator, said hanger being attached to the axle-tree of the sulky. The lower end of the hanger is forked, and a bolt, B, passes through the branches of the fork and through a plate, C, the rear end of which is divided for the reception of the front end of the cultivator-beam, which rests between the lips of said plate and is held in place by a bolt, M.

D represents a plow-beam, of any suitable description. E is a bar of a length somewhat less than that of the plow-beam. The ends of this bar are widened, and are provided with slots running transversely of its length. The bar is connected to one side of the plow-beam by means of bolts $G G^2$, passing through holes in the beam D, and through the slots $f f^2$ of the bar, and secured by nuts $g g^2$. By means of these slots and the bolts and nuts the bar E may be adjusted to different angles of inclination in order to regulate the depth of furrow to be made by the plow. One side of the bar E is provided with a bracket, H, lying at a right angle with the width of the said bar, so as to occupy a horizontal position when the bar is vertical. The front end of this bracket is provided with two holes, through which pass two bolts, J J, provided with nuts $i\ i$.

K represents a bar, of a length sufficient to reach beyond the two hangers A of the sulky. This bar is provided with a slot, $l$, running nearly its entire length. The bar is attached to the bracket H, and thus to the plow-beam, by means of the bolts J, which pass through the slots and are fastened by the nuts $i$.

When the attachment is to be used in connection with the sulky the cultivator-beams are detached therefrom, and the plow attachment is substituted therefor by inserting the ends of the slotted bar K between the lips of the plate C, and securing it by the bolts M, as shown in Fig. 2.

By means of the slot $l$ the plow-beam may be shifted laterally when desired.

Having thus fully described my invention, I claim as new and desire to secure by Letters Patent—

1. The combination, with a plow-beam, D, of the bar E, provided with the slots $f f^2$ and the bolts $G G^2$, passing through said slots and through holes in the plow-beam, and fastened by nuts, substantially as herein described.

2. The plow-beam D, bar E, bracket H, and slotted bar K, in combination with the plates C and hangers A of a sulky, as shown and described, for the purpose specified.

HOMER JOHNSON POTTER.

Witnesses:
  J. L. DEWEY,
  A. J. BEST.